United States Patent [19]

Fukushima et al.

[11] Patent Number: 5,698,290
[45] Date of Patent: Dec. 16, 1997

[54] PAPER FOR PACKAGING FOOD AND PRODUCTION METHOD THEREOF

[75] Inventors: Takashi Fukushima, Numazu; Mikio Tadokoro, Mishima, both of Japan

[73] Assignee: Eiwa Kagaku Kogyo Kabushiki Kaisha, Numazu, Japan

[21] Appl. No.: 663,227

[22] PCT Filed: Oct. 24, 1995

[86] PCT No.: PCT/JP95/02178

§ 371 Date: Jun. 17, 1996

§ 102(e) Date: Jun. 17, 1996

[87] PCT Pub. No.: WO96/13448

PCT Pub. Date: May 9, 1996

[30] Foreign Application Priority Data

Oct. 28, 1994 [JP] Japan ................... 6/287120

[51] Int. Cl.$^6$ ........................................ B32B 3/10
[52] U.S. Cl. ................ 428/138; 442/394; 442/398; 442/412; 156/244.18; 156/244.27
[58] Field of Search ............... 442/394, 398, 442/412; 156/244.18, 244.27; 428/138

[56] References Cited

U.S. PATENT DOCUMENTS 4,935,276  6/1990  Pawlowski et al. ............... 428/35.7

FOREIGN PATENT DOCUMENTS 3-14709    2/1991   Japan .
3-108671   11/1991  Japan .
3-289455   12/1991  Japan .
5-16675    3/1993   Japan .
5-305978   11/1993  Japan .

Primary Examiner—Christopher Raimund
Attorney, Agent, or Firm—Wenderoth, Lind & Ponack

[57] ABSTRACT

A paper for packaging food is disclosed which prevents vapor generated from the food from condensing on the packaging paper or on the inner wall of a container and prevents condensed water from again adhering to the food and deteriorating the taste and flavor of the food when the food is packaged, transported or preserved. This packaging paper is produced by bonding paper having water absorptivity and a gas-permeable nonwoven fabric made of a synthetic resin by a thermoplastic synthetic resin film having through-holes formed throughout the entire surface thereof. To produce this packaging paper, paper having a plurality of protrusions-recesses on the surface thereof and a nonwoven fabric are bonded by causing a molten thermoplastic synthetic resin to flow between the paper and the nonwoven fabric from a T-die by using an extrusion laminator. The bonding speed between the nonwoven fabric and the paper is higher than the flowdown speed of the molten resin from the T-die and a bonding pressure between a pressure roll and a chill roll is set to a pressure higher than the pressure employed in conventional laminated paper making processes. In this way, the thin molten resin layer is perforated by the rugged surface of paper.

10 Claims, No Drawings

1

PAPER FOR PACKAGING FOOD AND PRODUCTION METHOD THEREOF

TECHNICAL FIELD

This invention relates to novel and improved paper for packaging food which packages cooked food and can be re-heated by a microwave oven, etc, while packaging the food, and a method of producing this packaging paper for food.

BACKGROUND ART

It has been the fashion these days to purchase cooked food items to take them back home and to serve them by re-heating. Various containers have been used in the past for transporting and preserving the cooked food, but in the case of the food which generates vapor after cooking such as cooked rice, the vapor condenses on the cover of the container, and the water droplets so formed adhere to the food and deteriorate taste and flavor thereof.

An inner lining sheet for a food container, which can prevent the vapor generated during transportation and preservation of food from condensing on the inner wall surface of the container and again adhering to the food, a sheet for microwave heating, which enables the packaged food to be heated again by a microwave oven, food packaging materials for the same purpose, etc, have been proposed in the prior art references such as Japanese Patent Laid-Open No. 3-289455/1991, Japanese Patent Publication No. 3-14709/1991, Japanese Utility Model Laid-Open No. 3-108671/1991, and so forth.

When cooked food is stored in a container, it has been customary to put a sheet having hygroscopicity on the inner wall surface of the container or to cover the surface of the food with such a hygroscopic sheet so as to let the water droplets condensing on the inner surface of the container be absorbed by the sheet. However, when the end portion of the hygroscopic sheet put on the inner wall surface of the container deviates to expose portions where the inner wall surface comes into direct contact with the food, or when the hygroscopic sheet covering the surface of the food is not in its proper position to expose the portions of the food surface, the water droplets condensing on the wall surface are likely to adhere once again to the food at such portions.

Deviation of the hygroscopic sheet can be eliminated if the sheet is shaped into a bag shape in conformity with the shape of the container, but when the hygroscopic sheet does not have heat sealability, bag-making is troublesome and time-consuming. Therefore, an attempt has been made to bond a synthetic resin film having good heat sealability to the inner surface of the hygroscopic sheet. However, because the vapor condenses on the film surface, pores must be bored either mechanically or electrically in the entire surface of the film so as to permit permeation of the vapor.

When paper made of wood pulp is used as the hygroscopic sheet, high moisture-permeability and high hygroscopicity can be obtained. However, if paper is wetted by absorbing water, the pulp fiber is likely to peel and to contaminate the food when the wetted portion undergoes friction as the food is moved to other positions.

In the case of the cooked food which generates the vapor after it is put into a bag, is taken back home and is heated again by the microwave oven, the vapor condenses on the inner surface of the bag, and the resulting water droplets are likely to adhere again to the food or to establish a high moisture state inside the bag, and to deteriorate the taste and flavor of the food. Therefore, there remains the problem that the food must be taken out from the bag and placed into another container and be again heated.

Particularly in recent years, cooked food such as cooked rice has been centrally cooked and distributed to chain eating places, hotels, restaurants, supermarkets, convenience stores, schools, companies, etc, and the sale of the cooked food has become more and more popular. For this reason, paper for packaging food free from the problems described above has been earnestly required.

DISCLOSURE OF THE INVENTION

It is therefore an object of the present invention to provide novel and improved paper for packaging food, which is free from deterioration of the taste and flavor of the food due to re-adhesion of water droplets formed as a result of condensing of the vapor generated from the food during transportation and preservation, can take the food out of the package without allowing adhesion of the food to paper, does not contaminate the food, and does not spoil the taste and flavor of the food due to the occurrence of the vapor even when the food taken back home is re-heated as packaged.

It is another object of the present invention to provide a method which can efficiently produce the novel and improved paper for packaging food described above.

To accomplish the objects described above, according to the present invention, there is provided paper for packaging food characterized by a structure in which paper having water absorptivity and a nonwoven fabric made of a synthetic fiber and having gas-permeability are bonded to each other by a thermoplastic resin film having a plurality of through-holes formed throughout the entire surface thereof.

Packaging paper of the present invention having the structure described above is used for packaging food in such a manner that the nonwoven fabric made of the synthetic resin faces the food and the paper having water absorptivity exists on the outer surface.

The gas-permeable nonwoven fabric, which comes into contact with the food, does not absorb water but allows the vapor to pass therethrough. The thermoplastic synthetic resin film bonds the nonwoven fabric and the paper. Since the film has the through-holes throughout its entire surface, it passes the vapor but cuts off water. Paper having water absorptivity absorbs the vapor passing through the nonwoven fabric and the thermoplastic synthetic resin film, and absorbs also the water droplets formed as a result of condensing.

Further, the present invention provides a method of producing the food packaging paper having the structure described above. This method comprises the steps of loading paper having a plurality of protrusion-recesses on at least one of the surfaces thereof and having water absorptivity and a nonwoven fabric made of a synthetic fiber onto an extrusion laminator so that said surface of said paper having the protrusions-recesses is bonded to said nonwoven fabric; causing a molten thermoplastic synthetic resin to flow down between said paper and said nonwoven fabric from a T-die of said extrusion laminator, while controlling the bonding speed between said paper and said nonwoven fabric to a speed higher than the flowdown speed of said molten resin from said T-die and controlling the flowdown quantity of said molten resin so that a film formed after cooling said molten resin has a thickness not greater than 15 µm; and regulating a bonding pressure between a pressure roll and a chill roll for press-bonding said paper and said nonwoven fabric to a sufficient bonding pressure to perforate a layer of said molten resin between said paper and said nonwoven fabric by said surface of said paper having the protrusions-recesses.

In the packaging paper so produced, the thin layer of the molten resin caused to flow down between the paper and the nonwoven fabric is perforated by the rugged surface of paper having a plurality of protrusion-recesses, or concavo-convexities, at the time of pressure-bonding between the paper and the nonwoven fabric. As a result a plurality of through-holes are formed in the entire surface of the thermoplastic synthetic resin film formed after cooling of the molten resin thin layer. Therefore, the thermoplastic synthetic resin film used for bonding need not be perforated mechanically or electrically after bonding of the paper and the nonwoven fabric.

BEST MODE FOR CARRYING OUT THE INVENTION

A nonwoven fabric produced by fiber-bonding long fibers of an olefinic synthetic resin by heat fusion, that is, a spun bonded fabric, can be preferably used as the nonwoven fabric, and such a nonwoven fabric preferably has a basis weight of 10 to 40 g/m$^2$. Because the nonwoven fabric made of the olefinic synthetic resin has heat sealability, bag-making can be carried out easily when the packaging paper is used in a bag form.

Paper preferably used in the present invention includes paper having high water-resistance, low or no size and high water absorptivity, which is produced by beating relatively weakly a wood pulp for paper making and is subjected to paper-making by adding a fluororesin, an epoxy resin, a melamine resin, or the like, and its basis weight is generally from 30 to 100 g/m$^2$.

Paper preferably used in the present invention and having a rugged surface provided with protrusions-recesses on at least one of the surfaces thereof includes machine glazed paper having a plurality of protrusions-recesses on one of the surfaces thereof and produced by using a Yankee paper machine, paper having crepe imparted thereto during a paper-making process and embossed paper having ripples or protrusions-recesses formed throughout the entire surface thereof by using an embossing press roller.

The thermoplastic synthetic resin film for bonding the nonwoven fabric to the paper is preferably a polyolefinic synthetic resin, and the film thickness is generally from 3 to 15 μm and can be suitably adjusted depending upon the intended applications.

When the packaging paper of the present invention is produced, the bonding speed between the paper and the nonwoven fabric is set to be higher than the flowdown speed of the molten resin from the T-die. Such an operation can be accomplished by causing the molten resin having suitable fluidity to flow down between the paper and the nonwoven fabric from the T-die and pulling the paper and the nonwoven fabric while clamping a thin layer of the molten resin between the paper and the nonwoven fabric. Fluidity of the molten resin at this time is prefarably from 3 to 11 in terms of the melt flow rate (MFR) defined by JIS K 6760, and the pulling speed of the paper and the non-woven fabric, that is, the bonding speed, is preferably within the range of 80 to 120 m/min.

The bonding pressure between the pressure roll and the chill roll for press-bonding the paper and the nonwoven fabric must be kept at a higher level than the pressure employed in a conventional production of laminated paper so that the thin layer of the molten resin between the paper and the nonwoven fabric is reliably perforated by the rugged surface of the paper having protrusions-recesses. Preferably, the bonding pressure is generally from 2.0 to 4.0 kg/cm.

The packaging paper of the present invention is used preferably as an interior packaging bag of a heat insulating box for transporting cooked rice, and the like. This paper prevents the water droplets condensing on the inner wall of the heat insulating box from adhering again to the cooked rice and deteriorating the taste. Since the cooked rice in contact with the nonwoven fabric surface of the packaging paper can be easily taken off from the nonwoven fabric, there is no residual rice and the used bag can be directly disposed by burning. Since the cooked rice does not adhere to the heat insulating box, the heat insulating box can be washed easily, and quality of washing waste water becomes better.

A bag produced by using the packaging paper for food according to the present invention can be used for transporting and preserving cooked food and moreover, it can be re-heated by a microwave oven while packaging the food therein. Accordingly, the bag can be preferably used as a packaging bag capable of being re-heated by the microwave oven, and versatile applications can be expected.

EXAMPLE 1

A spun bonded nonwoven fabric (having a basis weight of 20 g/m$^2$) made of polypropylene long fibers as an olefinic synthetic resin and machine glazed paper (having a basis weight of 50 g/m$^2$) having protrusions-recesses on one of the surfaces thereof and made of a wooden bleached pulp by using a Yankee paper machine were bonded by a polyethylene film as a thermoplastic synthetic resin to produce packaging paper according to the present invention by using an extrusion laminator.

Namely, rolled products of the spun bonded nonwoven fabric and the machine glazed paper were loaded to the extrusion laminator so that the rugged surface of the paper could be bonded to the nonwoven fabric. Molten polyethylene (MFR 3.7) was caused to flow down from the T-die between the nonwoven fabric and the paper, and in order to control the bonding speed between the nonwoven fabric and the paper to be higher than the flowdown speed of molten polyethylene, the nonwoven fabric and the paper were pulled while clamping the molten polyethylene thin layer between the nonwoven fabric and the paper, and the bonding speed was set to 100 m/min. The bonding pressure between the pressure roll and the chill roll of the extrusion laminator at this time was kept at 3.8 kg/cm which was higher than the speed of conventional laminated paper making processes so that the molten polyethylene thin layer could be perforated by the rugged surface of the paper. Incidentally, the flowdown quantity of molten polyethylene was controlled so that the thickness of the polyethylene film formed after cooling became 10 μm.

Packaging paper so obtained had a basis weight of 80 g/m$^2$, a thickness of 0.189 mm, a breaking strength of 2.5 kg/cm$^2$, and a water absorption quantity of 75 g/m$^2$, and had high heat sealability.

When a blue dye solution was applied to the nonwoven surface side, blue spots appeared throughout the entire surface of the paper on the back side. It could be thus confirmed that a number of through-holes were formed on the entire surface of the polyethylene film.

A gusseted bag having a flat bottom was manufactured from this packaging paper by using a heat seal bag-making machine in a size corresponding to the inner dimension of a heat insulating box for storing cooked rice. The bag was fitted as the inner liner of the heat insulating box, cooked rice was placed into the bag and then the lid of the heat insulating box was placed on the box. Five hours later, cooked rice was taken out from the bag. It was confirmed that condensed water was absorbed in the sheet surface of the bag, and the cooked rice did not again absorb the condensed water and was kept in a satisfactory condition.

EXAMPLE 2

A meltblown nonwoven fabric (having a basis weight of 12 g/m$^2$) made of polypropylene long fibers as an olefinic synthetic resin and oil-resistant machine glazed paper (having a basis weight of 35 g/m$^2$) having protrusions-recesses on one of the surfaces thereof and made of wooden beached pulp which contained a fluororesin added thereto, were bonded by a high density polyethylene film as a thermoplastic synthetic resin to produce packaging paper according to the present invention, by using the extrusion laminator in the same manner as in Example 1. Incidentally, MFR of the molten high density polyethylene was 9.0 and the flowdown quantity from the T-die was controlled so that the thickness of the polyethylene film formed after cooling became 8 μm.

Packaging paper so obtained had a basis weight of 55 g/m$^2$, a thickness of 0.120 mm, a breaking strength of 1.5 kg/m$^2$, a water adsorption quantity of 41.0 g/m$^2$, grease resistance of 8.0 (3M Kit method) and had excellent heat sealability.

When a blue dye solution was applied to the nonwoven fabric surface side, blue spots appeared throughout the entire surface of the paper on the back side. It could be thus confirmed that a number of through-holes were formed on the entire surface of the polyethylene film. When a salad oil was dropped on the nonwoven surface side, smudging of the oil on the paper surface side was not observed.

Small bags were manufactured from this packaging paper by using a bag-making machine and fried chicken was put into the small bag and left standing for about 2 hours. However, the oil did not ooze out to the paper surface outside the small bag. When the bag was re-heated by a microwave oven at 600 W for 3 minutes and the fried chicken was taken out from the bag, water droplets did not adhere again to the surface of the fried chicken, and the fried chicken could be served under the same condition as purchased.

When 300 g of frozen pilaff was put into the small bag and was heated by the microwave oven at 600 W for 5 minutes, the oil did not ooze out to the paper surface outside the small bag. Though vapor generated during heating was observed inside the microwave oven, water droplets did not adhere again to the pilaff taken out from the small bag.

We claim:

1. Paper for packaging food characterized by a structure in which paper having water absorptivity and a nonwoven fabric made of a synthetic fiber and having water vapor-permeability are bonded to each other by a thermoplastic synthetic resin film having a plurality of through-holes, which are impermeable to water and permeable to water vapor, formed throughout the entire surface thereof.

2. Paper for packaging food according to claim 1, wherein said paper having water absorptivity is made predominantly of a wooden pulp for paper-making, and is provided with a surface having a plurality of protrusions-recesses on the bonding surface with said nonwoven fabric.

3. Paper for packaging food according to claim 1 or 2, wherein said nonwoven fabric having water vapor permeability is a nonwoven fabric produced by fiber-bonding fibers of an olefinic synthetic resin by heat fusion.

4. Paper for packaging food according to claim 1 or 2, wherein said thermoplastic synthetic resin film is an olefinic synthetic resin film.

5. Paper for packaging food according to claim 3, wherein said thermoplastic synthetic resin film is an olefinic synthetic resin film.

6. A method of producing paper for packaging food comprising the steps of:

loading paper having a plurality of protrusions-recesses on at least one of the surfaces thereof and having water absorptivity and a nonwoven fabric made of a synthetic fiber onto an extrusion laminator so that said surface of said paper having the protrusions-recesses is bonded to said nonwoven fabric;

causing a molten thermoplastic synthetic resin to flow down between said paper and said nonwoven fabric from a T-die of said extrusion laminator, while controlling the bonding speed between said paper and said nonwoven fabric to a speed higher than the flowdown speed of said molten resin from said T-die and controlling the flowdown quantity of said molten resin so that a film formed after cooling said molten resin has a thickness not greater than 15 μm; and regulating a bonding pressure between a pressure roll and a chill roll for press-bonding said paper and said nonwoven fabric to a sufficient bonding pressure to perforate a layer of said molten resin between said paper and said nonwoven fabric by said surface of said paper having the protrusions-recesses;

thereby producing paper for packaging in which said paper and said nonwoven fabric are bonded to each other by said thermoplastic synthetic resin film having a plurality of through-holes formed throughout the entire surface thereof.

7. A method of producing paper for packaging food according to claim 6, wherein paper made predominantly of a wooden pulp for paper-making is used as said paper.

8. A method of producing paper for packaging food according to claim 6 or 7, wherein a nonwoven fabric produced by fiber-bonding fibers of an olefinic synthetic fiber by heat fusion is used as said nonwoven fabric.

9. A method of producing paper for packaging food according to claim 6 or 7, wherein a polyolefinic synthetic resin is used as said thermoplastic synthetic resin.

10. A method of producing paper for packaging food according to claim 8, wherein a polyolefinic synthetic resin is used as said thermoplastic synthetic resin.

* * * * *